UNITED STATES PATENT OFFICE.

FRANCIS E. GALLAGHER, OF NEWTON, AND HARRY S. MORK, OF BOSTON, MASSACHUSETTS, ASSIGNORS TO STANDARD ALCOHOL COMPANY, OF NEW YORK, N. Y., A CORPORATION OF MAINE.

PROCESS OF PRODUCING FERMENTABLE SUGARS.

1,037,185.     Specification of Letters Patent.     Patented Aug. 27, 1912.

No Drawing.     Application filed June 6, 1912. Serial No. 702,065.

*To all whom it may concern:*

Be it known that we, (1) FRANCIS E. GALLAGHER and (2) HARRY S. MORK, citizens of the United States, residing at (1) Newton and (2) Boston, in the counties of (1) Middlesex and (2) Suffolk, State of Massachusetts have invented certain new and useful Improvements in Processes of Producing Fermentable Sugars, of which the following is a specification.

This invention relates to processes of producing fermentable sugars from sawdust, wood-waste or other cellulosic raw material, by the action of steam in presence of suitable so-called hydrolyzing agents.

According to the preferred embodiment of the process, the cellulosic raw material or wood-waste is introduced in its normally moist condition into a digester mounted for rotation, being thoroughly mixed, either before or after its introduction into the digester, with a suitable hydrolyzing agent, as for example sulfuric acid or hydrochloric acid in the proportion of 0.5 to 2.0 per cent. by weight of the charge. The digester is set in motion, and steam is introduced into the body of the charge at appropriate pressure, say seventy to one hundred pounds or somewhat more per square inch. Under these conditions the wood-waste undergoes hydrolysis with the production of fermentable sugars as is well understood, and the digestion is continued for a suitable period, as fifteen to sixty minutes, or until the conversion has proceeded to the desired extent. During this digestive treatment, portions of the vapors and volatile products arising from the charge or resulting from the reaction are permitted to escape from the digester, either into the air, or preferably into a suitable condensing system, the pressure within the digester being meanwhile sufficiently maintained. Such escape or withdrawal of the vapors and volatile products may be either continuous or intermittent, and is found to result in a material increase in the percentage of fermentable sugars produced under otherwise similar digestive conditions. While the underlying cause or causes of this observed result are not certainly known, it is now presumed that certain volatile products arising during the digestion act, either by tending to the establishment of a chemical equilibrium or otherwise, to check or limit the reaction which yields the fermentable sugars; and that by eliminating portions of such products continuously or at suitable intervals during digestion, the desired reaction is enabled to proceed more nearly to completion. There may also occur a better elimination of volatile products of antiseptic or fermentation-inhibiting character, as for example aldehydes or similar bodies, which, if retained in the mass and in the extract subsequently prepared therefrom would have a retarding effect upon the yeast. The relief of the pressure may also have purely mechanical effects tending to increase the yield, as for instance by giving rise to internal ebullition tending to a more perfect distribution or action of the hydrolyzing agent.

It is found that by relieving the pressure of volatile matters during the digestion, as above described, not only is a higher percentage of soluble products obtained under digestive conditions otherwise similar, but an increased percentage of these soluble products consists of fermentable sugars. In other words, the pressure-relief affords a direct and substantial increase in the percentage of alcohol obtainable from the cellulosic raw material.

The process may be carried out by the aid of any suitable apparatus, as for example that shown in the application of George M. Tomlinson, Serial No. 674,165, filed January 29, 1912, the necessary pressure-relief being obtained by partially opening the valve between the digester and the condensing system.

It will be understood that when resinous woods are used the digestive treatment may be preceded, if desired, by a distillation treatment for the recovery of turpentine or like hydrocarbons. This preliminary treatment for the recovery of volatile hydrocarbons is to be distinguished from the digestive treatment for the preparation of fermentable sugars, to the conduct of which the present invention relates. The invention is also to be distinguished from the mere provision of a safety-valve in connection with the digester, such safety-valve being intended to guard against the possibility of such accidental excessive pressures and temperatures within the digester as might have a deleterious effect upon the operation.

We claim:—

1. The process of producing fermentable sugars from ligno-cellulose or other cellulosic raw materials, which consists in digesting the material under pressure of steam and in presence of a suitable hydrolyzing agent until fermentable sugars are formed, and permitting vapors or volatile products to escape from the digester during the digestive period.

2. A process of producing fermentable sugars from ligno-cellulose or other cellulosic raw materials, which consists in digesting the material in a state of motion under pressure of steam and in presence of a suitable hydrolyzing agent until fermentable sugars are formed, and relieving the pressure of the vapors during the digestive period.

In testimony whereof, we affix our signatures in presence of two witnesses.

FRANCIS E. GALLAGHER.
HARRY S. MORK.

Witnesses:
CARL T. WOODS,
MALCOLM C. WARE.

Copies of this patent may be obtained for five cents each, by addressing the "Commissioner of Patents, Washington, D. C."